(12) United States Patent
Bowe, Jr. et al.

(10) Patent No.: US 7,308,410 B2
(45) Date of Patent: Dec. 11, 2007

(54) METHOD AND SYSTEM FOR INSTANTIATING ENTITLEMENTS INTO CONTRACTS

(75) Inventors: Thomas W. Bowe, Jr., Pleasanton, CA (US); Sridhar Tadepalli, Richmond, CA (US); Atul Purohit, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 536 days.

(21) Appl. No.: 10/299,265

(22) Filed: Nov. 18, 2002

(65) Prior Publication Data
US 2007/0225986 A1 Sep. 27, 2007

Related U.S. Application Data

(63) Continuation of application No. 09/967,895, filed on Sep. 28, 2001, now abandoned.

(51) Int. Cl.
*G06Q 30/00* (2006.01)
*G06F 3/00* (2006.01)

(52) U.S. Cl. .................. 705/1; 715/749; 715/764; 709/223; 718/100

(58) Field of Classification Search ............ 705/1–500; 715/500–867; 709/200–257; 718/1, 100–108
See application file for complete search history.

(56) References Cited

U.S. PATENT DOCUMENTS

| 5,272,623 | A | * | 12/1993 | Grubb et al. | ............... 717/100 |
|---|---|---|---|---|---|
| 5,692,206 | A | * | 11/1997 | Shirley et al. | ............... 715/531 |
| 6,067,531 | A | * | 5/2000 | Hoyt et al. | .................... 705/35 |
| 6,961,902 | B2 | * | 11/2005 | Anecki et al. | ............... 715/530 |
| 2002/0059132 | A1 | * | 5/2002 | Quay et al. | .................... 705/37 |
| 2002/0099669 | A1 | * | 7/2002 | Lauer | ........................... 705/80 |
| 2003/0046261 | A1 | * | 3/2003 | Baker | ............................ 707/1 |
| 2003/0069818 | A1 | * | 4/2003 | Menninger | .................... 705/35 |

* cited by examiner

*Primary Examiner*—Lewis A. Bullock, Jr.
(74) *Attorney, Agent, or Firm*—Campbell Stephenson LLP

(57) ABSTRACT

Techniques to facilitate the creation of contracts and to automatically instantiate entitlements into contracts. A number of entitlement templates may be created for various entitlements. Each entitlement template is typically defined to include certain specifically defined entitlements. The entitlement templates may further be associated with products. A contract may thereafter be formed having any number of line items for one or more products and/or assets. Upon execution of the contract, an agreement is formed and the entitlements (if any) for each product/asset included in the contract may be instantiated (e.g., via a button on a screen). Upon instantiation of the entitlements into the contract, the covered products/assets become entitled and can thereafter receive the entitlements defined in the templates associated with the products/assets.

27 Claims, 14 Drawing Sheets

METHOD AND SYSTEM FOR INSTANTIATING ENTITLEMENTS INTO CONTRACTS

BACKGROUND OF THE INVENTION

The present invention relates generally to computer processing, and more particularly to techniques to instantiate entitlements into contracts.

Contract creation and management are ubiquitous challenges faced by many industries and organizations. In many industries, complex products and/or services may be offered, and these offerings may be associated with complex pricing structures, entitlements, billing and service delivery requirements, and so on. To simplify the contracting and management processes, standard contracts with standards terms may be created and used for these offerings. However, these "canned" contracts are not acceptable for many organizations because of their inflexible nature.

On the other extreme, customized contracts with individually selected and tailored terms can provide the most flexibility. However, such customized contracts are typically time-consuming to draft and even more challenging to manage. In many instances, this total flexibility is not necessary or even desirable.

Many contracts include entitlements (i.e., benefits, such as services) as well as obligations (i.e., liabilities, such as monthly payments). Entitlements typically comprise certain "coverage" that a customer is entitled to receive under the contract (e.g., services, discounts, and so on). Entitlements may be defined to cover one or more products and/or assets for a particular period of time.

In general, a contract may be drafted to include any number of terms, and each term may be drafted to cover any matter of importance between contracting parties. For example, a contract may define certain pricing structure, cover certain services, offer certain preventive maintenance, and so on. For each of these terms, the scope of coverage may differ depending on various factors such as, for example, the parties to the contract, the price paid, and so on. Contracts may thus be viewed as comprising unstructured information of various types.

The task of creating contracts that meet the needs and requirements of an organization can be challenging. The challenge often magnifies as the complexity and/or the number of product and/or service offerings increase. Thus, techniques that can assist an administrator or an end-user (e.g., a sales associate) to efficiently form contracts (with the proper entitlements) and which are sufficiently flexible to cover most if not all contracting situations, are highly desirable.

SUMMARY OF THE INVENTION

The invention provides techniques to facilitate the creation of contracts and to automatically instantiate entitlements into these contracts. The entitlements may be any type of benefits to be received under the contracts. The automatic instantiation of entitlements can greatly simplify the process for creating contracts, reduce data entry, minimize errors, and provide various other advantages.

In an aspect, a number of entitlement templates may be created for various entitlements and stored for later use. Each entitlement template is typically defined to include certain specifically defined entitlements (e.g., preventive maintenance, services, service level, special pricing, and so on). The entitlement templates may further be associated with products in several ways. In one way, a product may be associated with one or more entitlement templates. In another way, one or more entitlement templates may be used to form a product (e.g., a service offering, such as an extended warranty or a maintenance plan) that may then be offered and included in a contract.

A contract may thereafter be formed having any number of line items, with each line item covering one or more products and/or assets (an asset is an instance of a particular product). Upon execution of the contract, an agreement is formed and the entitlements (if any) for each product/asset included in the contract may be instantiated (e.g., via a button provided in a screen used to display the contract). Upon instantiation of the entitlements into the contract, the covered products/assets become entitled and can thereafter receive the entitlements defined in the templates associated with the products/assets.

The invention provides methods, computer program products, systems, and user interface screens, capable of implementing various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

FIG. 4 shows a screen that may be used to create, edit, and manage entitlement templates;

FIG. 5 shows a screen that may be used to view and edit agreements for executed contracts;

FIG. 6C shows a screen with a Preventive Maintenance sub-view used to view and specify preventive maintenance plans for a given entitlement template;

FIG. 6D shows a screen with a Service Details sub-view used to view and define details for services for a given entitlement template;

FIG. 6E shows a screen with a Price Details sub-view used to view and define special pricing for a set of defined products for a given entitlement template;

FIG. 7 shows a screen that may be used to associate entitlement templates with products;

FIG. 8 shows a screen that may be used to view and edit a selected agreement and to instantiate entitlements from templates into the agreement.

DESCRIPTION OF THE SPECIFIC EMBODIMENTS

Figure 1:
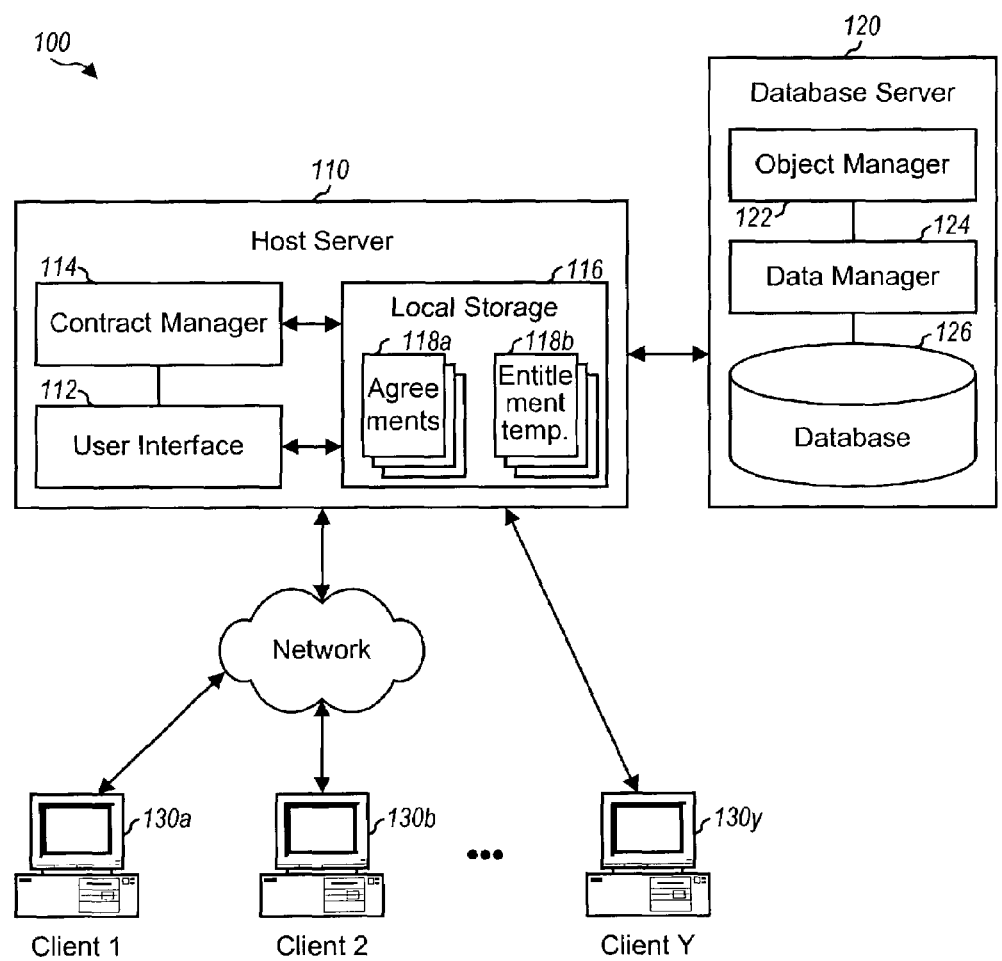
FIG. 1 is a diagram illustrating a contract management system, in accordance with a specific embodiment of the invention.

FIG. 1 is a diagram illustrating a contract management system 100, in accordance with a specific embodiment of the invention. In this embodiment, contract management system 100 is implemented on a set of one or more host servers 110 that couple to and interact with one or more client computers 130 via direct connection, a computer network (e.g., the Internet), and/or some other means. Host server(s) 110 further couple to a database server 120 that stores data (typically in a "raw" form) used by the contract management system.

In an embodiment, contract management system 100 includes a number of modules such as a user interface module 112 and a contract manager 114. Additional, fewer, and/or different modules may also be included in contract management system 100, and this is within the scope of the invention.

User interface module 112 provides the interface (e.g., screens) used to present information to an administrator and/or an end-user of the contract management system. User interface module 112 further receives and interprets user commands and data, which may be provided via mouse clicks, mouse movements, keyboard inputs, and other means. User interface module 112 then provides the received data and commands to other modules, which then perform the appropriate responsive action.

Contract manager 114 facilitates the creation and management of contracts. Contract manager 114 receives requests to form contracts for various product and service offerings and, in response, provides the necessary screens, tools, templates, and data to support the creation of contracts. Contract manager 114 also receives selections for various fields, and forms contracts having the data and selections.

The modules within contract management system 100 may operate on and share the data stored in a central database 126. Typically, raw data from database 126 is retrieved by a module within contract management system 100 and processed into a form more suitable for that module. The processed data is then stored to a local storage 116 to allow for fast and efficient access to the data. In an embodiment, templates (used to generate new contracts) and executed contracts (i.e., agreements) may be stored in local storage 116. Local storage 116 may be implemented with a semiconductor memory (e.g., RAM, Flash), a hard disk, or some other data storage technology that can provide fast access to the data stored thereon.

In an embodiment, database server 120 manages the central database for contract management system 100 and includes an object manager 122, a data manager 124, and database 126.

Object manager 122 manages the interaction with the database and, in an embodiment, includes business objects (BO), business services (BS), and business components (BC) (not shown in FIG. 1 for simplicity). The business objects model major entities (e.g., contracts, templates, and so on) in the contract management system with associated business rules. Each business object is made up of a hierarchy of parent-child components, which model relationship with appropriate specialized operations. The business services are the basic components for building complex behavior. New business services may be created and linked into multi-step control flows to provide complex behavior encompassing multiple business objects. The business components provide real time access to remote objects without replication of data within database 126. A business object may be made up of a number of business components managed by the contract management system.

Data manager 124 manages database 126 and performs this function by invoking SQL objects. Database 126 stores data for the contract management system, and possibly for other systems that may be combined with the contract management system to provide the overall system.

Contract management system 100 provides screens and tools to support efficient creation of contracts and to organize and display agreements. System 100 further provides tools to quickly and easily generate entitlement templates, which may then be used to quickly and efficiently instantiate entitlements into contracts, as described below. Contract management system 100 may be used for numerous industries and organizations. For example, contract management system 100 may be used for organizations that provide services, offer rentals, sell products, provide leasing or financing, manage resources, and so on.

As used herein, a contract is a document that defines the business relationship between two parties. A contract may be complex and typically describes the obligations to perform, provide, sell, offer, or produce specific activities, responsibilities, products, or services over a determined period of time for a specific amount of money. A contract may cover sales of goods, services, or a combination of both. A contract typically includes detailed descriptions of pricing, terms, limitations, coverage, conditions, legal rights, extension clauses, and other guidelines. A contract can thus include various types of unstructured information. As used herein, an agreement is an executed contract, and the term "contract" may generically refer to either an executed contract (i.e., an agreement) or an unexecuted contract.

The invention provides techniques to facilitate the creation of contracts and to automatically instantiate entitlements into contracts. The automatic instantiation of entitlements can greatly simplify the process for creating contracts, reduce data entry, minimize errors, and provide various other advantages.

Figure 2A:
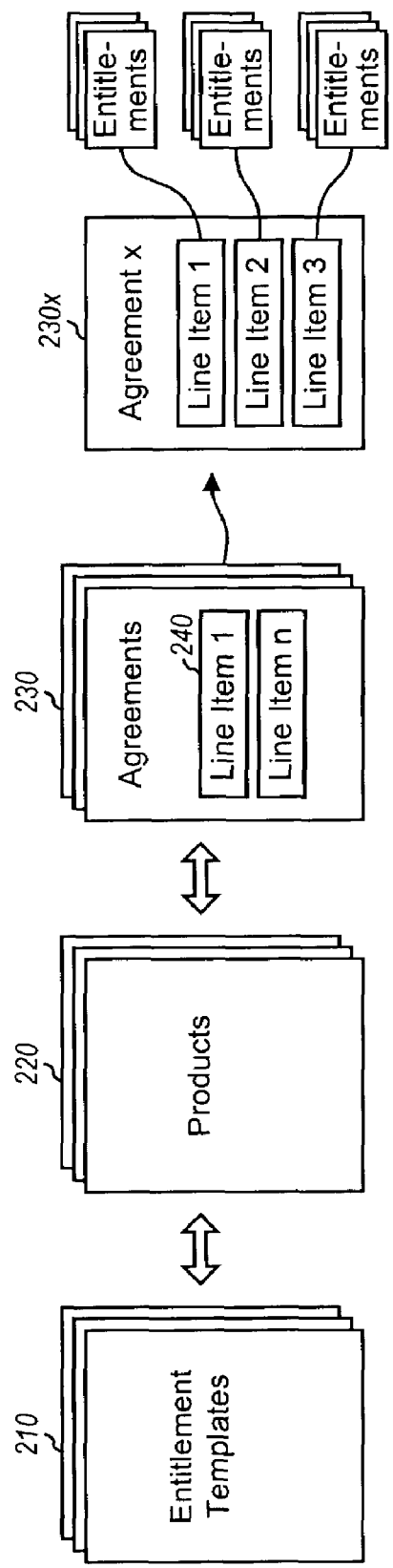
FIG. 2A is a diagram illustrating various components used to support the automatic instantiation of entitlements into contracts.

FIG. 2A is a diagram illustrating various components used to support the creation of contracts and the automatic instantiation of entitlements into contracts, in accordance with an embodiment of the invention. Initially, one or more entitlement templates 210 may be created (e.g., by an administrator or an end-user), with each entitlement template including certain specifically defined entitlements. These entitlement templates may be saved in a library and thereafter selected for use.

Entitlement templates 210 are further associated with products 220, which may be achieved in several ways. In one way, a product available for contracting may be associated with one or more entitlement templates. In another way, one or more entitlement templates may be used to form a product (e.g., a service offering, such as an extended warranty or a maintenance plan) that may then be offered and included in a contract. The association between entitlement templates and products may be such that any entitlement template may be associated with any product (e.g., as defined by the administrator). These products may also be included in the library and thereafter selected for contracting.

A contract 230x may thereafter be formed having any number of line items 240. Each line item 240 may cover one or more previously defined products 220, some other products, and/or one or more assets, with each asset being a specific instance of a particular product. Upon execution of contract 230x, an agreement is formed and the entitlements (if any) for each product 220 covered by contract 230x may be instantiated. Upon instantiation of the entitlements into the contract, the covered products/assets become entitled and can thereafter receive the entitlements defined in the templates associated with the products/assets. The agreement may then be stored in the database. Any number of agreements 230 may be formed from previously created contracts, and each agreement may include any combination of entitlements for the products/assets included in the contract.

As a specific example, vendor X may sell a range of products. One of its products, "Bronze Service", comes with 24/7 technical supports, 1-year preventive maintenance, and unlimited toner replacement. For this product, an administrator may initially define one entitlement template with the following coverage:

Technical Support—set the service calendar to 24×7;
Preventive Maintenance—set the contract management system to trigger a preventive maintenance action based on a particular schedule (e.g., every 90 days); and
Onsite Service—add "toner" to a "Price Details" field and specify a price of $0.

The administrator then associates this entitlement template with the Bronze Service product. Alternatively, three entitlement templates may be formed, one for each benefit, and these entitlement templates may then be associated with the Bronze Service product.

Thereafter, a particular customer may inquire about the Bronze Service for a particular equipment (e.g., a printer or copier) previously purchased or concurrently being purchased through vendor X. A sales associate for vendor X would then create a contract for the Bronze Service product, add the Bronze Service product to a line item in the contract, and further add the specific asset (i.e., equipment) to be covered by the Bronze Service product to the line item. The sales associate may then price the configured package (i.e., the Bronze Service product, as applied to the specifically identified asset) by hitting a "Reprice" button on the screen. In response, the correct price of the Bronze Service product for the specified asset is retrieved from a price list and displayed.

After the customer agrees to purchase the Bronze Service product, the sales associate adds the entitlements for the Bronze Service product into the contract and further activates the contract. This may be achieved, for example, by hitting an "Entitle" button (on the screen used to display the contract) to automatically instantiate the entitlements from the three templates associated with the Bronze Service product into the contract. This automatic instantiation of entitlements can greatly simply the process to create new contracts and provide other advantages.

Figure 2B:
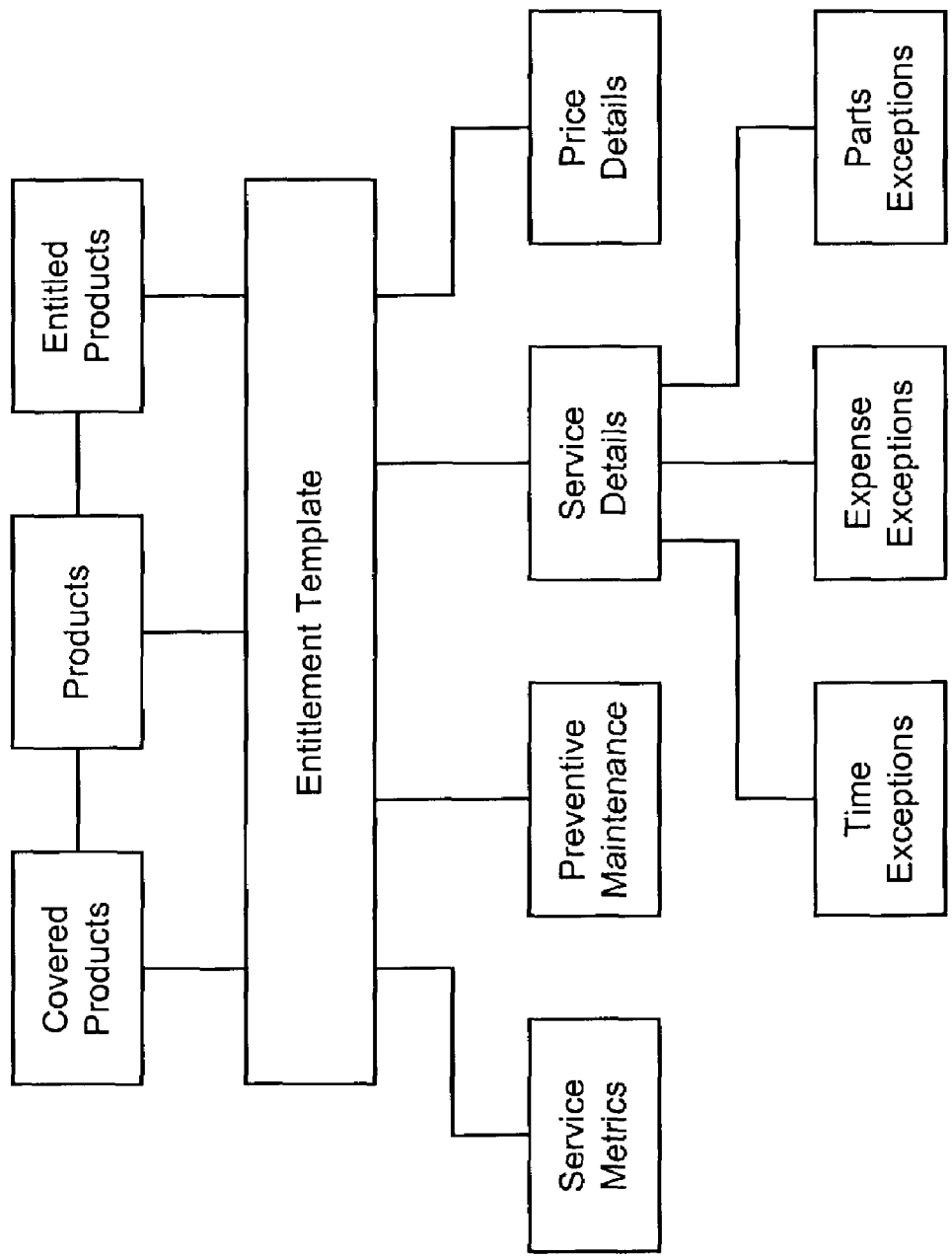
FIG. 2B is a diagram of an embodiment of a data model for an entitlement template.

FIG. 2B is a diagram of a data model for an entitlement template, in accordance with a specific embodiment of the invention. A number of entitlement templates may be created for various types of entitlement. Each entitlement template may be defined to cover one or more products and/or one or more assets, which may be selected from a list of all available products/assets. An asset (e.g., computer X) is a specific instance of a particular product (e.g., computer). The products/assets covered by the entitlement template become entitled when the entitlements in the template are instantiated. One or more entitlement templates may also be used to form a product (e.g., a service offering, such as an extended warranty or a maintenance plan) that may then be offered and included in a contract.

Each entitlement template may be defined to include one or more types of entitlement. The different types of entitlements may include, for example, Service, Field Service, Pricing, Support, Preventative Service, Comprehensive, and so on. Support may be a simple entitlement that specifies, for example, the days and daily hours of remote support (technical support, help desk, remote diagnostics, web self-service, and so on). Comprehensive may comprise any combination of the other types of entitlements.

Each entitlement type may be made up of one or more components. Table 1 lists some of the different entitlement components that may be included for each entitlement type, which may then be included in an entitlement template. For example, the Comprehensive entitlement type may include all of the components used simultaneously in a single entitlement template. Fewer, additional, and/or different entitlement types and components may also be made available for inclusion in entitlement templates, and this is within the scope of the invention.

TABLE 1

| Entitlement Components | Description |
| --- | --- |
| Products | products that may be selected for coverage under the entitlement template |
| Service Metrics | metrics used to define the level of service to be provided under the entitlement template |
| Preventive Maintenance | preventive maintenance plans covered by the entitlement template |
| Service Details | service activities covered by the entitlement template; exceptions may be defined for each type of service: Time Exception - parameters for determining charges for time spent in connection with an activity Expense Exception - parameters for determining charges for expenses incurred connection with an activity Parts Exception - parameters for determining charges for parts required for an activity |
| Pricing Details | special pricing under the entitlement template for a set of defined products and resources |

As used herein, a "product" may be defined as any tangible or intangible item such as, for example, a good, a person, a resource, a service, a class, training, and so on. "Preventive maintenance" may be defined to include any proactive action that may be defined (e.g., by an administrator or an end-user) and which may be initiated based one or more defined trigger events. As examples, proactive actions may include automatically sending a customer an email or letter informing him/her of recommended services and/or replacements, upgrades, or inspections for part based on actual asset usage and/or actual product performance indicators, monitors, measurements, readings, and/or telemetrics. The entitlement components listed in Table 1 are described in further detail below.

Figure 3:
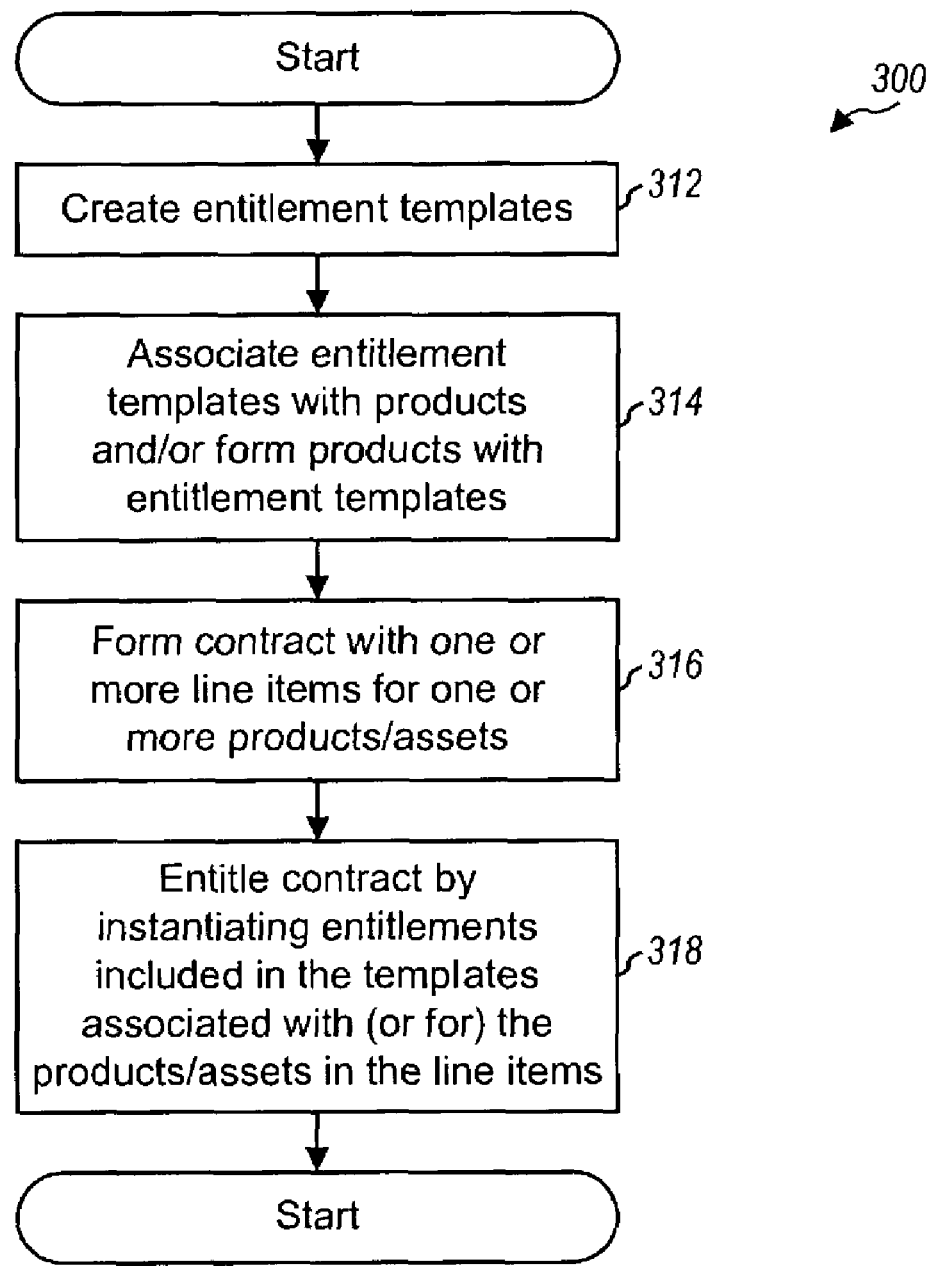
FIG. 3 is a flow diagram of an embodiment of a process to automatically instantiate entitlements into a contract.

FIG. 3 is a flow diagram of a process 300 to automatically instantiate entitlements into a contract, in accordance with an embodiment of the invention. Initially, entitlement templates are created (e.g., by an administrator and/or an end-user), at step 312. Each entitlement template may be defined to include one or more types of entitlement, and each entitlement type may be defined to include one or more components (e.g., service metrics, preventive maintenance, services, special pricing, and so on). The entitlements are benefits that may be received under the contract that includes the entitlement template. For example, a particular entitlement template may be defined to cover free service and parts for a particular period of time.

Entitlement templates are further associated with products in several ways, at step 314. A particular product may be defined to be associated with one or more entitlement templates. The entitlements defined in these templates would then be received when the product is purchased.

Alternatively or additionally, one or more entitlement templates may be used to form a product. For example, a service product for extended warranty may be defined to include entitlement templates that cover certain free services and parts for a particular time period. This service product may then be purchased separately to cover certain specified products/assets. The entitlements would then be received if the service product is purchased.

Subsequently, a contract is formed with one or more line items, at step 316. Each line item covers one or more products/assets. Each product/asset may be associated with (or may comprise) one or more entitlement templates. The contract may be executed and entitled by instantiating the entitlements included in the templates associated with (or for) the products/assets covered by the agreement line items, at step 318. The instantiation of entitlements into the contract may be performed automatically, e.g., by hitting an "Entitle" button. Entitlement templates may also be instantiated by end-users offline or remotely (i.e., while the users are disconnected from the system) and may be synchronized during the next connection with the system. Various details for process 300 are described below.

The invention may be implemented in various manners and using various user interfaces (e.g., screens). For clarity, a specific implementation of various aspects and embodiments of the invention is described below.

Defining Entitlement Templates

Figure 4:
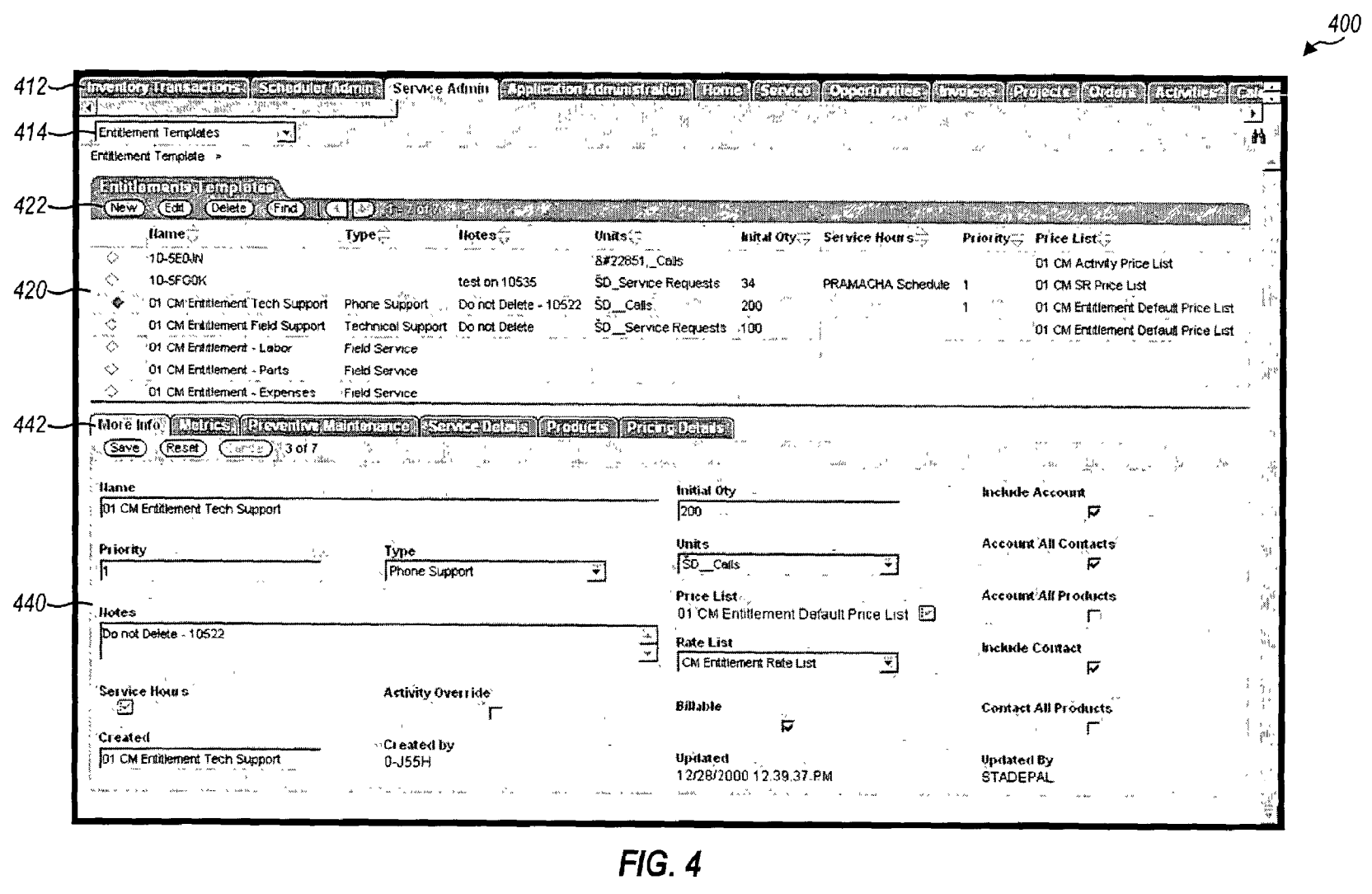

FIG. 4 shows a screen 400 that may be used (e.g., by an administrator or an end-user) to create, edit, and manage entitlement templates, in accordance with a specific embodiment of the invention. Screen 400 includes main menu tabs 412 that may be used to invoke various modules, functionality, and features provided by the overall system. In such a design, the contract management system may represent just one of many individual systems included in the overall system. Upon selection of a particular tab (e.g., "Service Admin"), a list box 414 is provided to allow the administrator/end-user to select one of a number of possible tasks supported by the selected module. In the example shown, the "Entitlement Templates" choice is selected in list box 414.

Screen 400 also shows an Entitlement Templates list applet 420 that is displayed in response to the selection of the "Entitlement Templates" choice in list box 414. Via list applet 420, the administrator/end-user is able to create a new entitlement template, edit or delete an existing entitlement template, or perform other functions related to entitlement templates (e.g., search, save, and so on). These functions may be invoked by clicking on the proper button in a set of buttons 422 provided in list applet 420.

In the embodiment shown, Entitlement Templates list applet 420 displays previously created and available entitlement templates using a list table. The list table includes a number of data rows, with each data row corresponding to a record for one entitlement template. The list table further includes a number of columns for a number of fields of each entitlement template. Table 2 lists various fields that may be defined for an entitlement template and the corresponding descriptions. Fewer, additional, and/or different fields may also be defined for an entitlement template, and this is within the scope of the invention.

TABLE 2

| Field | Description |
| --- | --- |
| Name | the name of the entitlement template |
| Type | the entitlement type; may be selected from a list of Service, Warranty, Pricing, Field Service, Technical Support, Preventive Maintenance, Phone Support, Help Desk, Remote Support, Internet, Training, Subscriptions, Comprehensive, and so on |
| Priority | the user-assigned priority for the entitlement template |
| Service Hours | a service calendar, if any, applicable for the entitlement template |
| Units | the unit used to measure the entitlement covered by the template (e.g., a telephone call, an on-site visit) |
| Initial Qty | the number of units covered by the entitlement template (e.g., five calls, two on-site visits) |
| Price List | a Price List, if any, to be used for the entitlement template |
| Rate List | a Rate List, if any, to be used for the entitlement template |
| Billable | a flag to indicate whether certain charges and expenses may be billed for the entitlement template |

A number of service calendars may be defined (e.g., by an administrator/end-user), and each service calendar may identify a particular time period during which entitlements maybe received (e.g., 9-5 normal business hours, 24/7, and so on). Similarly, a number of Price Lists (Rate Lists) may also be defined, and each Price List (Rate List) may define a particular pricing (rate) structure for various benefits covered by the entitlement template, such as services, parts, and so on.

A scroll bar may be provided on top of the list table, in button set 422 as shown in FIG. 4, to allow the administrator/end-user to scroll and view other fields for the entitlement templates.

Screen 400 also shows an Entitlement Detailed form applet 440 that may be displayed for a selected entitlement template or a new entitlement template. A particular entitlement template in Entitlement Templates list applet 420 may be selected, e.g., by clicking on the entitlement template. A new entitlement template may also be created, e.g., by clicking on the "New" button in button set 422. Entitlement Detailed form applet 440 would then include either previously entered information for the selected entitlement template or blank and/or default information for the new entitlement template. Through form applet 440, an administrator/end-user is able to define and/or edit the contents of the selected or new entitlement template.

In the embodiment shown in FIG. 4, Entitlement Detailed form applet 440 includes a number of tabs 442 for a number of different "sub-views" that may be selected by the administrator/end-user. Each sub-view provides information for a respective entitlement component, and may be invoked to view and/or edit the fields for the corresponding entitlement component. In the embodiment shown in FIG. 4, tabs are provided for "More Info", "Metrics", "Preventive Maintenance", "Service Details", "Products", and "Pricing Details" sub-views. FIG. 4 shows an embodiment of the More Info sub-view, which may be used to view information for the selected entitlement template.

As noted above, a new entitlement template may be created by clicking on the New button in button set 422 in Entitlement Templates list applet 420. In one embodiment, upon activating a new entitlement template, the fields for Entitlement Detailed form applet 440 are cleared and new information may be entered for the entitlement template. In another embodiment, upon activating a new entitlement template, some or all of the fields in form applet 440 are populated with default values, which may then expedite the entitlement template creation process. In yet another embodiment, an existing entitlement template may be copied and used as the starting point for a new entitlement template. The fields of the copied entitlement template may then be edited to create the desired template.

An existing entitlement template may be deleted by selecting the entitlement template and clicking on the "Delete" button in button set 422. Upon clicking the Delete button, the highlighted entitlement template is deleted from the database. A pop-up window may be displayed to query the administrator/end-user for reconfirmation of the delete action.

In an embodiment, access within contract management system 100 may be controlled such that certain functions may be performed only by certain authorized personnel. For example, only the administrator may be granted access to create, edit, and/or delete entitlement templates, and the end-users may only be allowed to associate entitlement templates with products.

Figure 5:
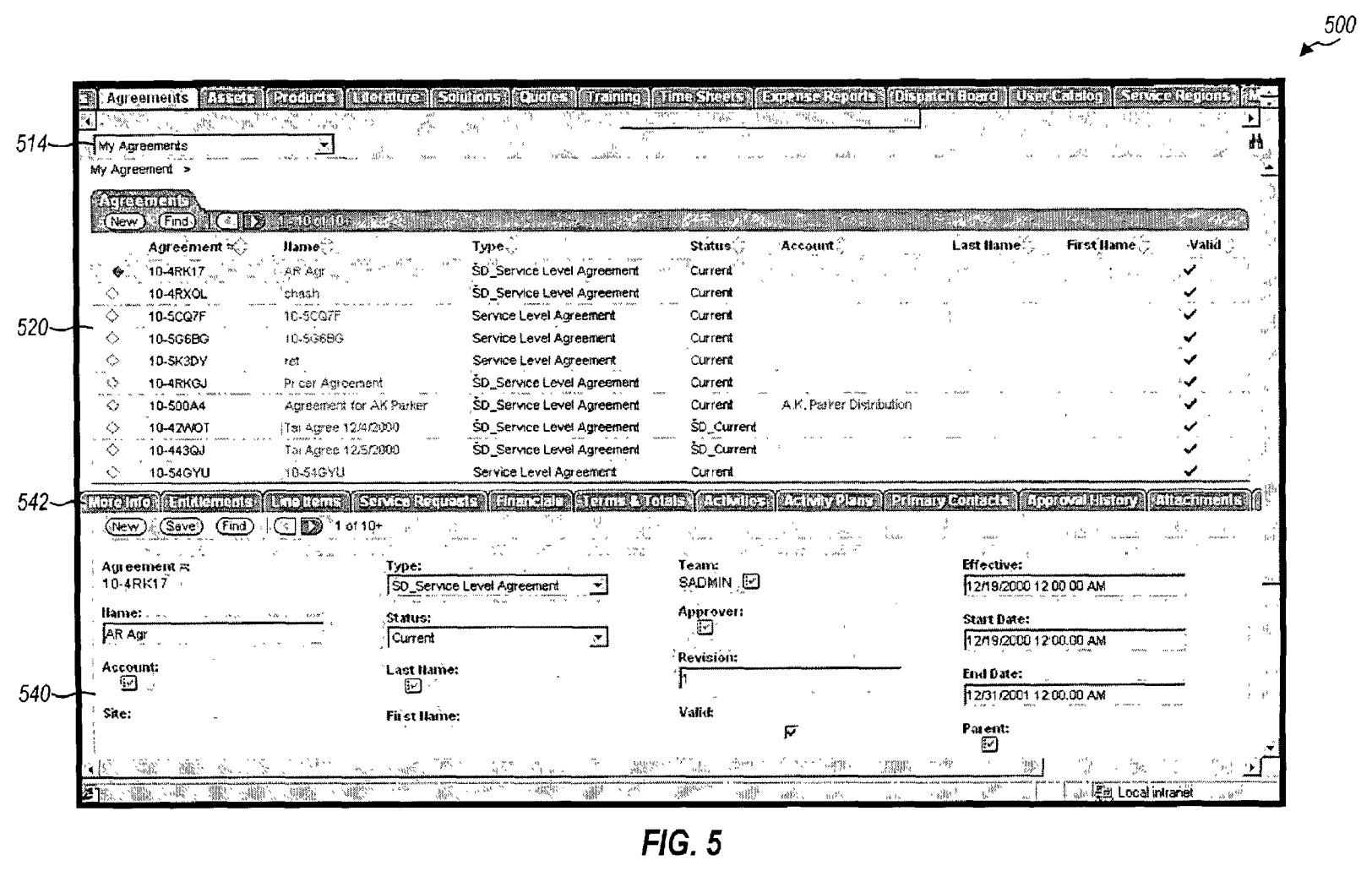

FIG. 5 shows a screen 500 that may be used by an administrator or an end-user to view and edit agreements, in accordance with a specific embodiment of the invention. Screen 500 includes an Agreements list applet 520 that is displayed in response to the selection of the "My Agreements" choice in a list box 514. Agreements list applet 520 includes a list table that displays a set of agreements. One or more criteria may be used to determine the agreements to be displayed. For example, the agreements displayed in the list table may include all agreements managed by a particular end-user, agreements for a particular account, agreements for a particular product, and so on. The list table includes a number of data rows, with each data row corresponding to a record for one agreement. A particular agreement in the list table may be selected by highlighting (e.g., clicking on) the corresponding data row. The selected agreement may then be displayed with a different color in the list table for ease of viewing.

Screen 500 also includes an Agreement form applet 540 that displays information for either an agreement selected in Agreements list applet 520 or a new agreement as a result of hitting the New button in list applet 520. Agreement form applet 540 includes main tabs 542 that may be invoked to obtain various "views" of the selected agreement, with each view providing a different set of information (e.g., a different set of applets) for the selected agreement. In FIG. 5, Agreement form applet 540 shows general information for the selected agreement.

Figure 6A:
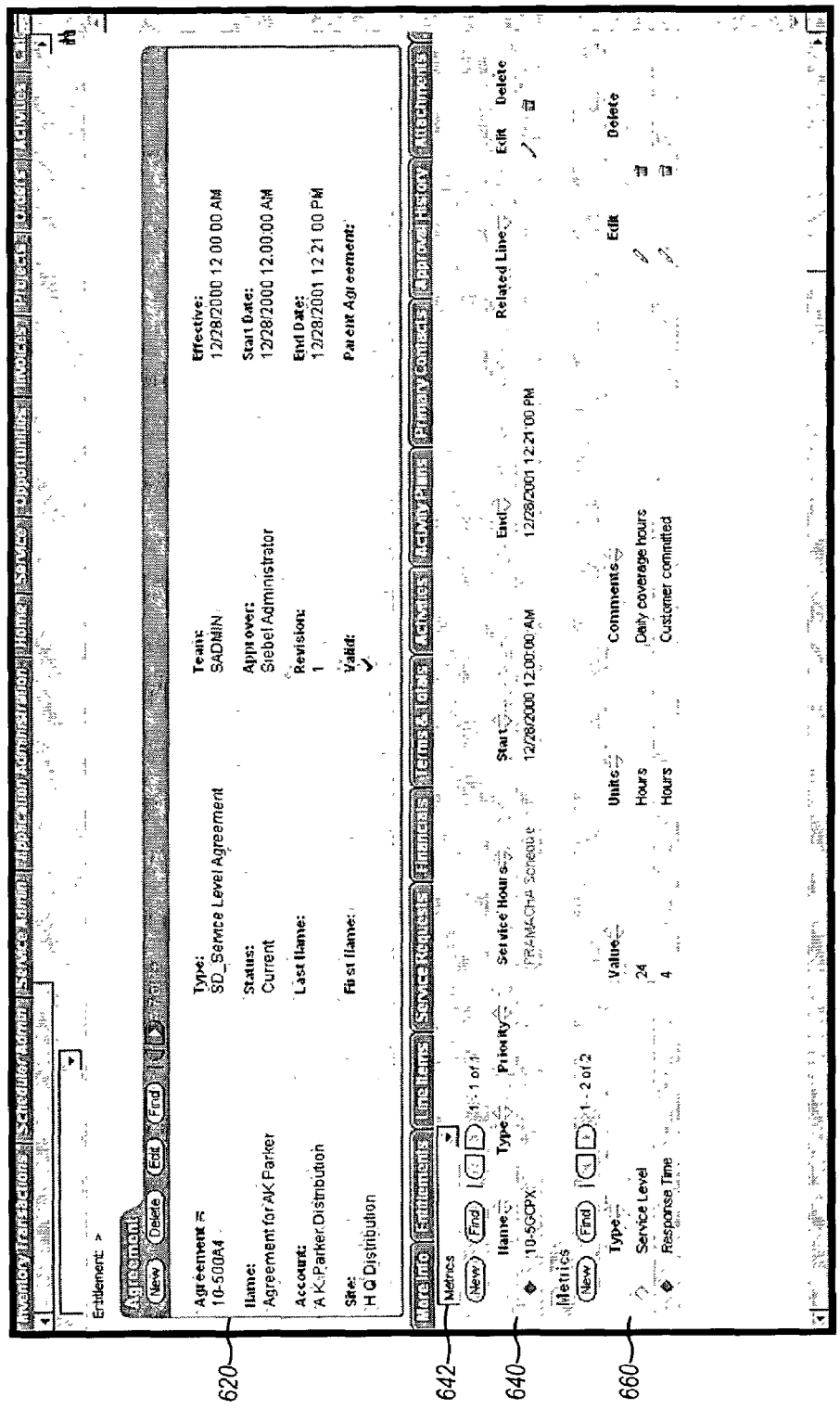
FIG. 6A shows a screen with a Metrics sub-view used to view and edit service metrics for a given entitlement template.

FIG. 6A shows a screen 600 that may be used to view and edit information for a particular agreement, in accordance with a specific embodiment of the invention. Screen 600 may be displayed in response to selecting the "Entitlements" tab in menu tabs 542 in Agreement form applet 540. Screen 600 includes an Agreement form applet 620 that provides information for the selected agreement (which in this example is different from the one shown in form applet 540 in FIG. 5).

Screen 600 also shows an embodiment of a Metrics sub-view that may be used to view and edit service metrics for a given entitlement template. The Metrics sub-view may be displayed in response to the selection of "Metrics" in a list box 642. (A corresponding Metrics sub-view may also be provided via the "Service Admin" tab, similar to that shown in FIG. 4, and used to edit information for the entitlement template.) In the embodiment shown in FIG. 6A, the Metrics sub-view in screen 600 includes an Entitlements list applet 640 and a Metrics list applet 660.

Entitlements list applet 640 includes a list table that displays all entitlement templates associated with the selected agreement, one entitlement template per data row in the list table. Upon selecting a particular entitlement template in list applet 640, the service metrics for the selected entitlement template are displayed in Metrics list applet 660.

Metrics list applet 660 includes a list table that displays all service metrics defined for the selected entitlement template, one performance metric per data row in the list table. These service metrics define the level of service to be received under the entitlement template. Various service metrics may be defined for a given entitlement template. In the example shown in FIG. 6A, the service metrics include "Service Level" and "Response Time". The Service Level metric specifies the coverage time (e.g., 24-hour daily coverage, 9-5 normal business hours, and so on). The Response Time metric specifies the maximum response time for a service call, and may be specified in hours (e.g., 4 hours), days, or some other units. New service metrics may also be added for the entitlement template and defined via the New button in Metrics list applet 660, and existing service metrics may be edited or deleted. Fewer, additional, and/or different service metrics may also be defined for the entitlement template and are within the scope of the invention.

Figure 6B:
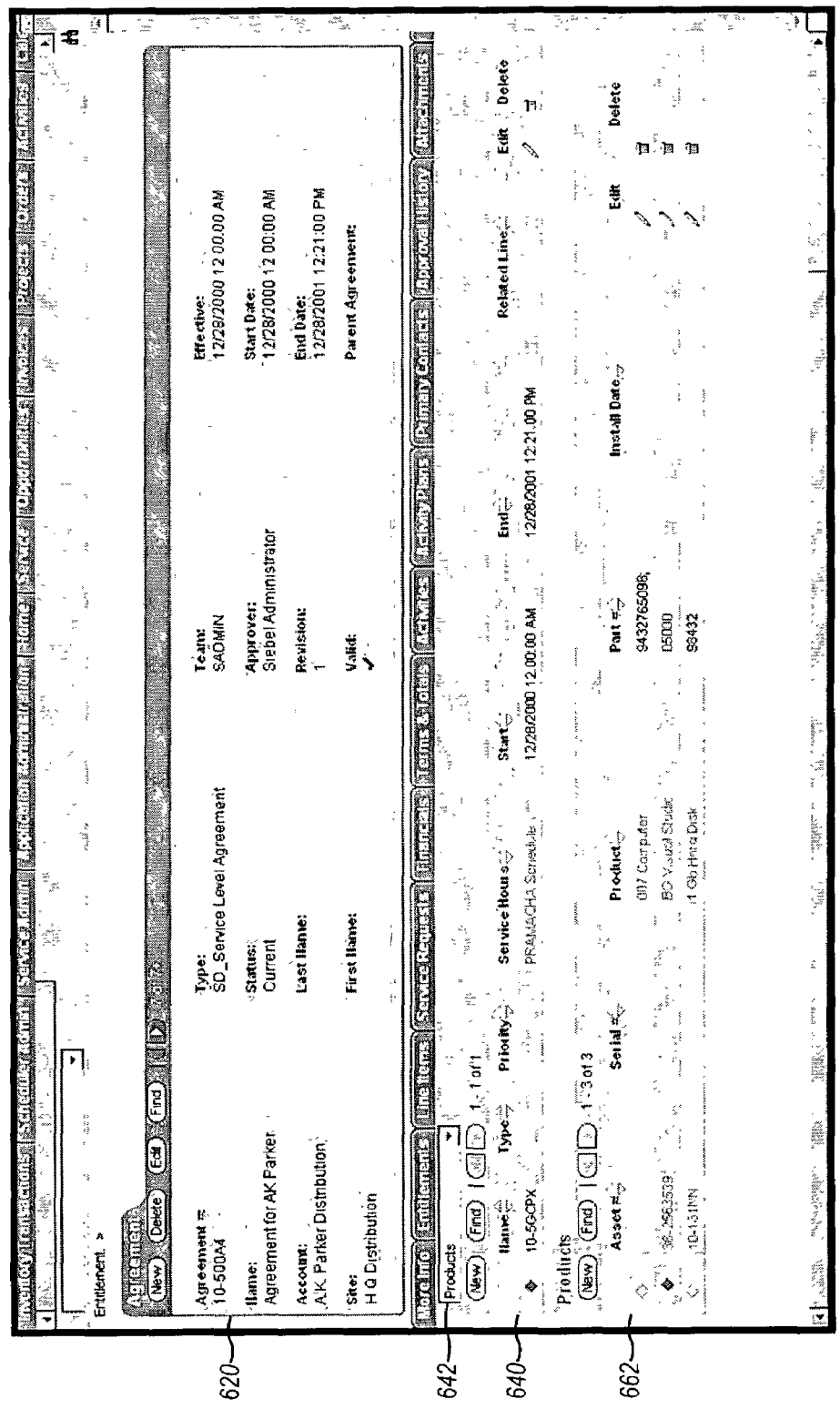
FIG. 6B shows a screen with a Products sub-view used to view and specify products and/or assets to be associated with a given entitlement template.

FIG. 6B shows a screen 602 that includes an embodiment of a Products sub-view, which may be used to view and specify products and/or assets to be associated with a given entitlement template. The Products sub-view may be displayed in response to the selection of "Products" in list box 642. In the embodiment shown in FIG. 6B, the Products sub-view includes Entitlements list applet 640 and a Products list applet 662. A particular entitlement template may be selected in list applet 640, and Products information for the selected entitlement template is then provided in Products list applet 662.

Products list applet 662 includes a list table that displays all products/assets that may be selected for coverage by the selected entitlement template, one product/asset per data row in the list table. As noted above, a product may be defined as any tangible or intangible item such as, for example, a good, a person, a resource, a service, a class, training, and so on. A covered product/asset is one that may be selected to receive the entitlements defined by the template. In the example shown in FIG. 6B, the covered products/assets include the product "Computer", the asset "36-2563538" which is an instance of the product "BG Visual Studio", and the asset "10-131 NN" which is an instance of the product "Hard Disk". Other fields are also included in the list table to further describe the products/assets, including the "Part #" and "Install Date" fields. A new product/asset may be added to the entitlement template by invoking the New button in Products list applet 662, and an existing covered product/asset may be edited or deleted.

Figure 6C:
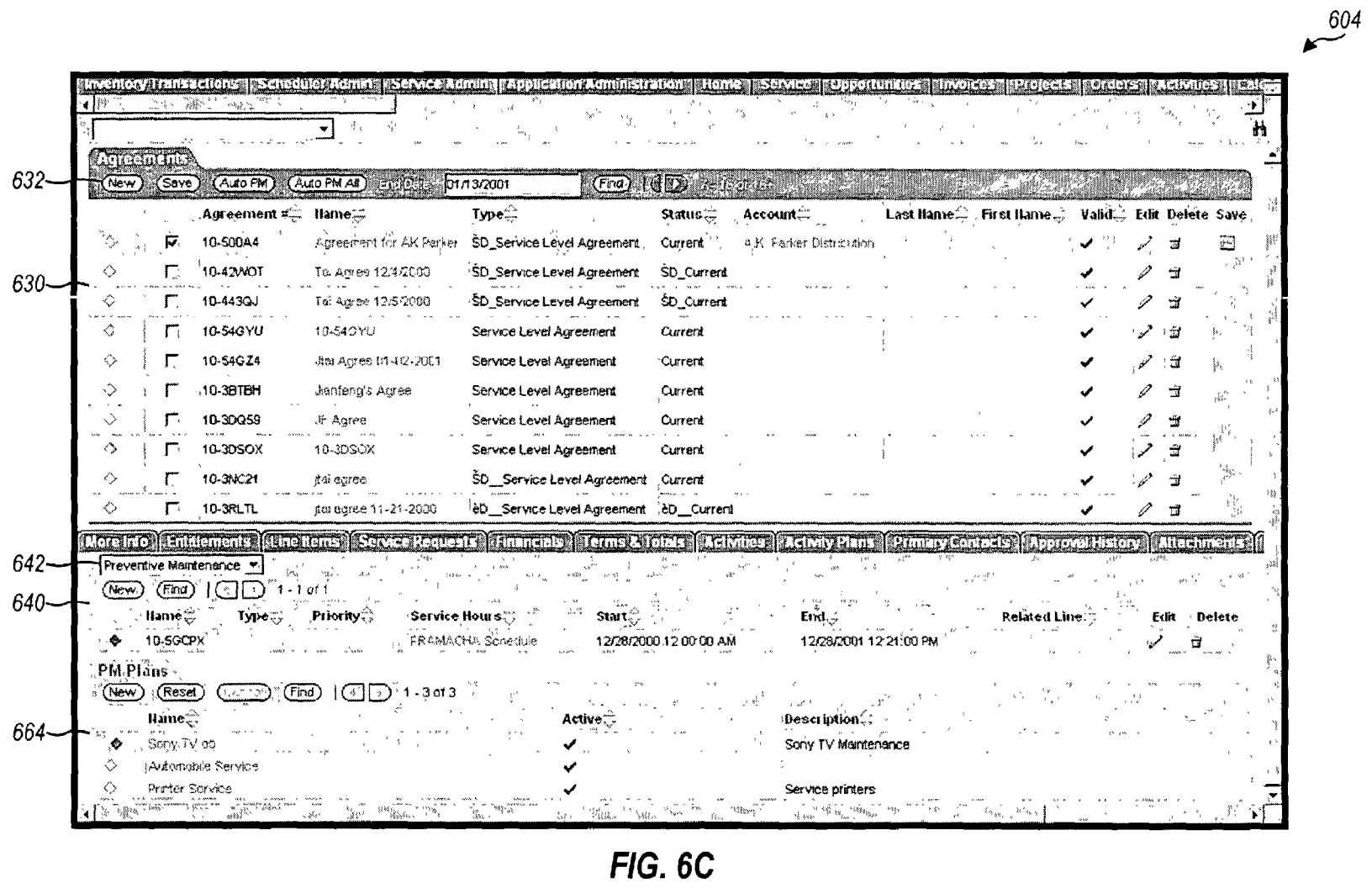

FIG. 6C shows a screen 604 that includes an embodiment of a Preventive Maintenance sub-view, which may be used to view and specify preventive maintenance plans for a given entitlement template. Screen 604 includes an Agreements list applet 630 used to display a set of agreements selected based on one or more criteria. List applet 630 is similar to Agreements list applet 520 in FIG. 5. A particular agreement in list applet 630 may be selected, and additional information for the selected agreement is provided in the lower applets. Agreements list applet 630 further includes an "Auto PM" button used to automatically add a particular PM plan to a checked agreement and an "Auto PM All" button used to automatically add a particular PM plan to all agreements displayed in list applet 630.

In the embodiment shown in FIG. 6C, the Preventive Maintenance sub-view includes Entitlements list applet 640 and a PM Plans list applet 664. The Preventive Maintenance sub-view may be displayed in response to the selection of "Preventive Maintenance" in list box 642. A particular entitlement template may be selected in Entitlements list applet 640, and the Preventive Maintenance information for the selected entitlement template is then provided in PM Plans list applet 664.

PM Plans list applet 664 includes a list table that displays all preventive maintenance plans for the selected entitlement template, one plan per data row in the list table. Each preventive maintenance plan may be defined to cover any number and type of proactive actions for one or more specific assets (e.g., computer X) and/or one or more specific products (e.g., computer), and may further be defined to cover a particular service schedule, a list of service tasks, and so on. For example, a particular plan may call for regular cleaning of a particular copier each week and refill of toner each month.

In the example shown in FIG. 6C, the PM plans include "Sony TV", "Automobile Service", and "Printer Service". These plans may be defined via another System Admin screen. An "Active" field indicates whether or not the plan is enabled for the selected entitlement template. A new plan may be included in the entitlement template via the New button in PM Plans list applet 664.

Figure 6D:
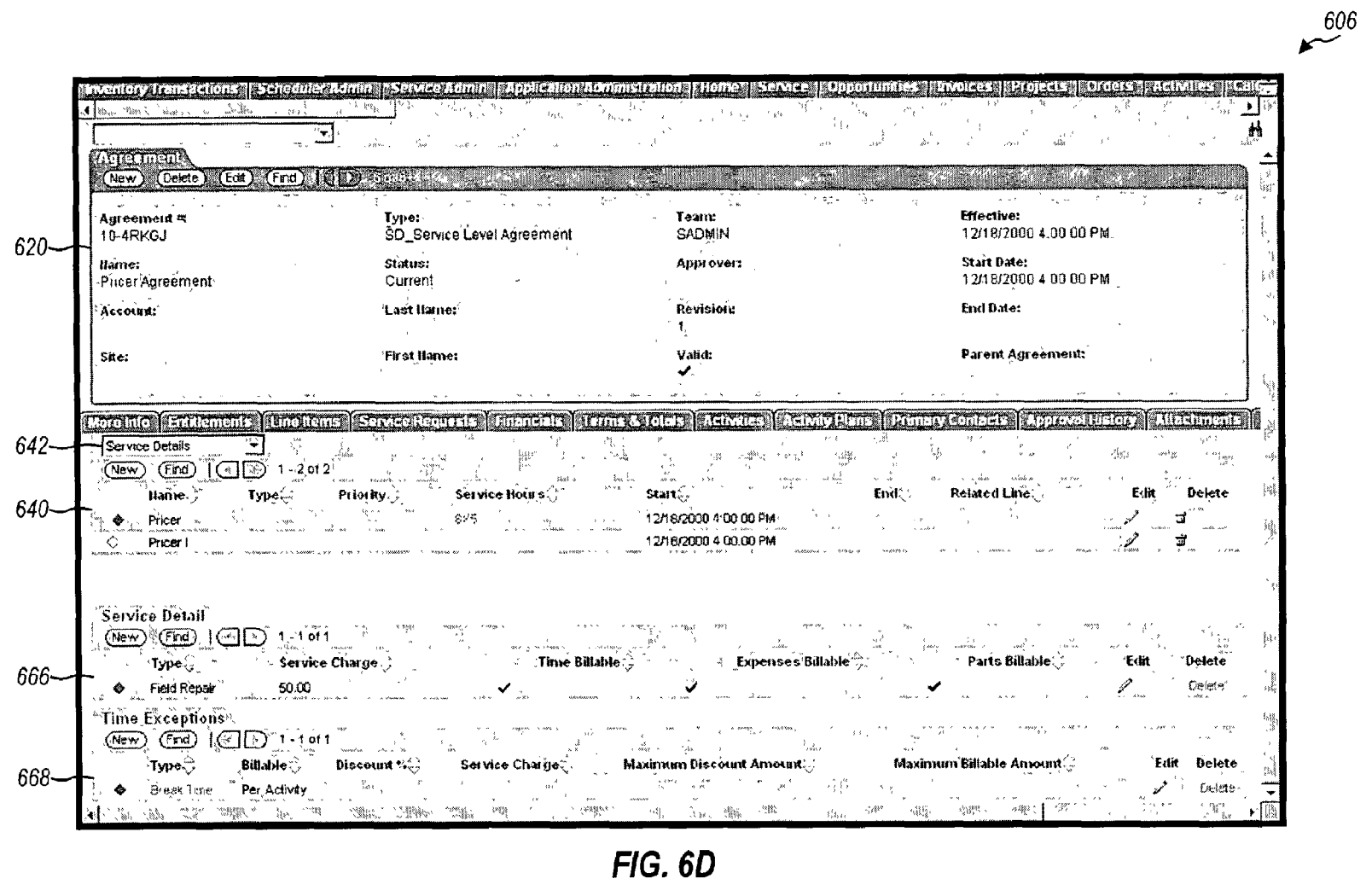

FIG. 6D shows a screen 606 that includes an embodiment of a Service Details sub-view, which may be used to view and define service details for a given entitlement template. The Service Details sub-view may be displayed in response to the selection of "Service Details" in list box 642. In the embodiment shown in FIG. 6D, the Service Details sub-view includes Entitlements list applet 640, a Service Detail list applet 666, and a Time Exceptions list applet 668. A particular entitlement template may be selected in list applet 640, and the Service Details information for the selected entitlement template is then provided in list applets 666 and 668.

Service Detail list applet 666 includes a list table that displays all types of service activity covered by the selected entitlement template, one service activity type per data row in the list table. Various service activity types may be covered by a given entitlement template such as, for example, "Phone Support", "Field Repair", "Technical Support", "Preventive Maintenance", "Service", and so on.

Table 3 lists various fields that may be defined for a service activity type in Service Detail list applet 666 and the corresponding descriptions. Fewer, additional, and/or different fields may also be defined and are within the scope of the invention.

TABLE 3

| Field | Description |
| --- | --- |
| Service Charge | a service charge to be billed for each occurrence of the service activity |
| Time Billable | a flag to indicate whether or not the time spent for the service activity may be billed |
| Time Discount % | a discount to be applied to time charges |
| Maximum Time Discount | the maximum discount allowable for time charges for the service activity |
| Maximum Time Billed | the maximum that may be billed for time charges for the service activity |
| Expense Billable | a flag to indicate whether or not the expenses incurred for the service activity may be billed |

TABLE 3-continued

| Field | Description |
| --- | --- |
| Expense Discount % | a discount to be applied to expenses |
| Maximum Expense Discount | the maximum discount allowable for expenses |
| Maximum Expense Billed | the maximum that may be billed for expenses |
| Parts Billable | a flag to indicate whether or not the parts used for the service activity may be billed |
| Parts Discount % | a discount to be applied to parts charges |
| Maximum Parts Discount | the maximum discount allowable for parts charges |
| Maximum Parts Billed | the maximum that may be billed for parts charges |

The Service Charge is the only charge for the service activity if the Time, Expense, and Parts Billable flags (including their exceptions) are not checked. If any one of these three flags is checked, then the Service Charge is additive to any other charges that may also be incurred.

The Time, Expense, and Parts Billable flags effectively form the general rules for billing charges and expenses incurred for the service activity. Exceptions to the general rules for each service activity type may be defined via a Time Exceptions, an Expense Exceptions, and a Parts Exceptions list applet. The Time, Expense, and Parts Exceptions applets allow for customization of each service activity type covered by the entitlement template.

Time Exceptions list applet 668 includes a list table that displays all exceptions for time charges for the selected service activity type in Service Detail list applet 666. The list table includes one time exception per data row. List applet 668 may be used to define various parameters for billing time charges. Table 4 lists various fields that may be defined for Time Exceptions and the corresponding descriptions. Fewer, additional, and/or different fields may also be defined and are within the scope of the invention

TABLE 4

| Field | Description |
| --- | --- |
| Type | a type for time, which is selected from a pick list |
| Service Charge | a charge for this time type, which may be the only charge for time or may be additive to other charges for time |
| Billable | Yes - always billable<br>No - never billable<br>Default - unit for billing this time type (e.g., per activity, per incident) |
| Discount % | a discount to be applied to this time type |
| Maximum Discount Amount | the maximum discount for this time type |
| Maximum Billable Amount | the maximum charge for this time type |

An existing time exception may be edited or deleted, and a new time exception may be added by hitting the New button in list applet 668.

The Expense Exceptions and Parts Exceptions applets may similarly be used to define various parameters for determining charges for expense and parts, respectively, incurred for a service activity. The Parts Exceptions applet may also be used to define a price basis for computing the parts charges (e.g., cost, list, or promotional), the type of pricing to be applied to the price basis (e.g., a fixed discount amount, a discount percentage from the price basis, a mark-up amount, a mark-up percentage, or some other entered price).

In the example shown in FIG. 6D, "Field Repair" is the only service activity type covered by the entitlement template. For the Field Repair, the fields in list applet 666 are defined such that a service charge of $50 is billed for each occurrence of field repair, and charges for time, expense, and parts may each be billed depending on how the time, expense, and parts exceptions are defined.

Figure 6E:
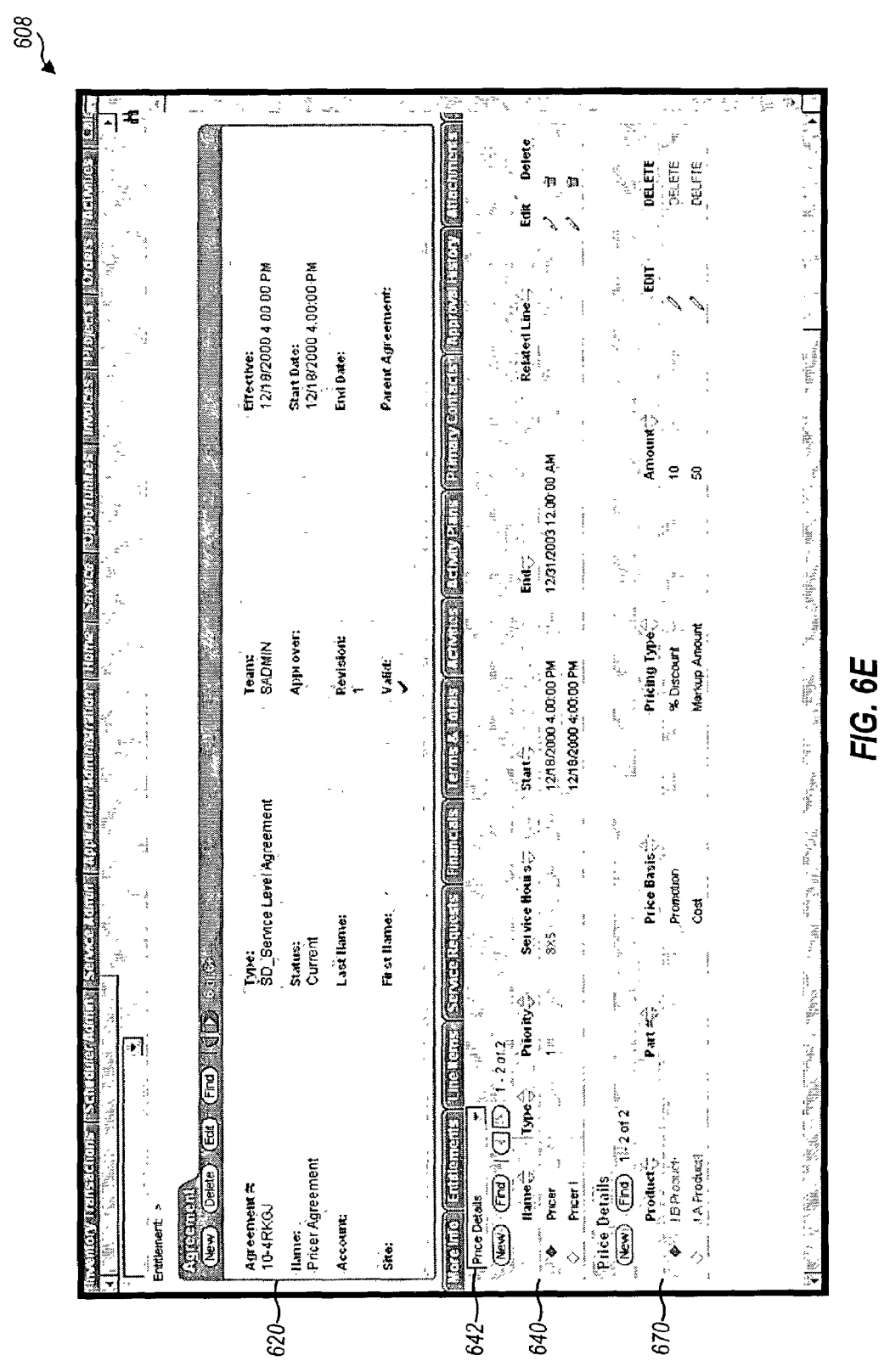

FIG. 6E shows a screen 608 that includes an embodiment of a Price Details sub-view, which may be used to view and define product pricing for a given entitlement template. The Price Details sub-view may be displayed in response to the selection of "Price Details" in list box 642. In the embodiment shown in FIG. 6E, the Price Details sub-view includes Entitlements list applet 640 and a Price Details list applet 670. A particular entitlement template may be selected in list applet 640, and the Price Details information for the selected entitlement template is then provided in list applet 670.

Price Details list applet 670 includes a list table that displays all products entitled to receive special pricing under the selected entitlement template, one product per data row in the list table. Each product may be associated with a particular pricing structure. Table 5 lists various fields that may be defined for Price Details and the corresponding descriptions. Fewer, additional, and/or different fields may also be defined and are within the scope of the invention

TABLE 5

| Field | Description |
| --- | --- |
| Product | a product entitled to receive special pricing under the entitlement template |
| Part # | the part number for the product |
| Price Basis | a base price for the product from which adjustments, if any, are made; may be selected as either Cost, List, or Promotional |
| Pricing Type | a method for computing adjustments to the price basis |
| Amount | the amount of adjustment to be applied to the price basis (in percent or dollar amount, e.g., 10% discount) |

Associating Entitlement Templates with Products

A number of entitlement templates may be defined and saved in a database (e.g., database 126 and/or local storage 116 in FIG. 1). Once created, an entitlement template may thereafter be associated with any product.

Figure 7:
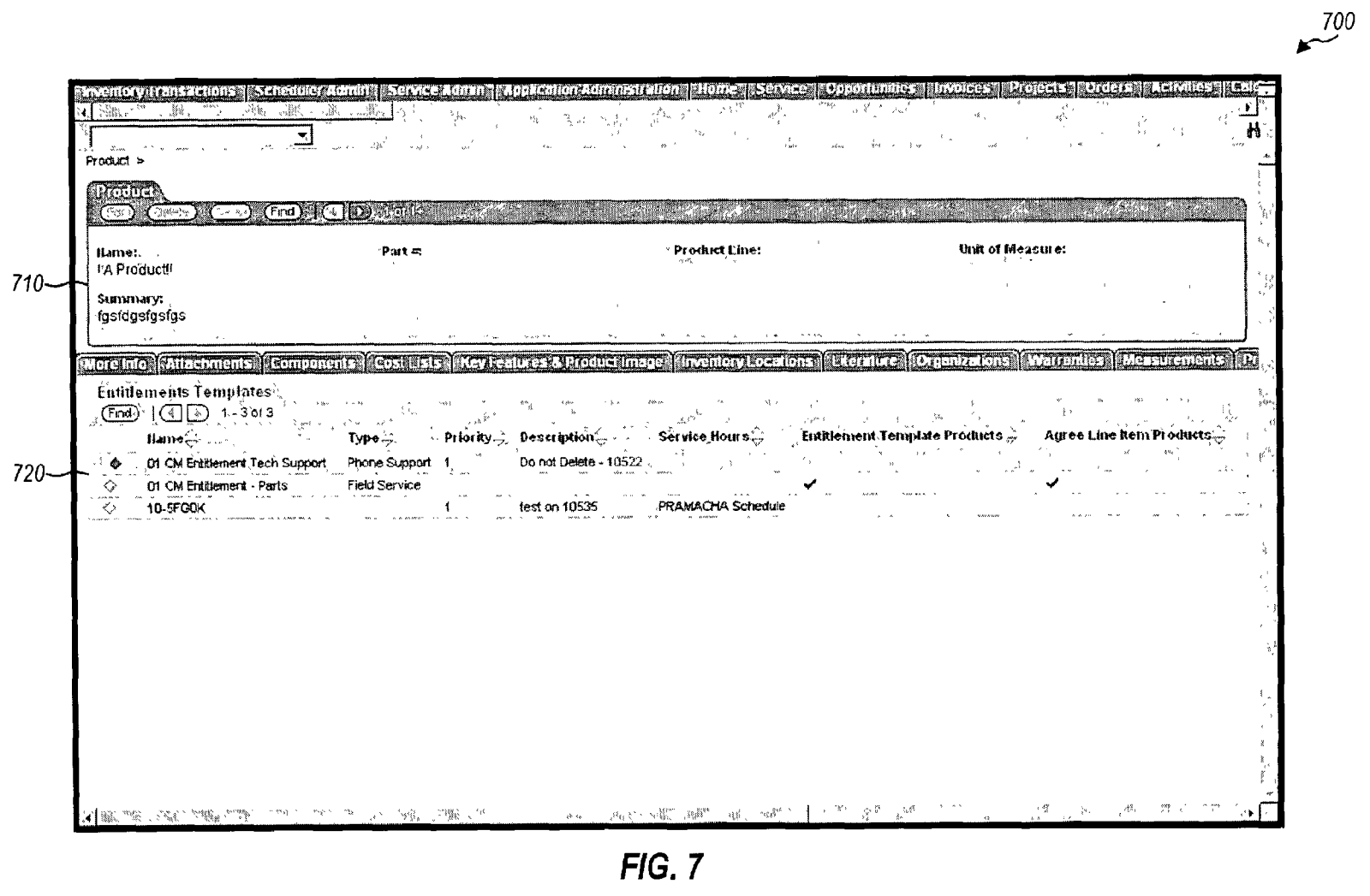

FIG. 7 shows a screen 700 that may be used to associate entitlement templates with products, in accordance with a specific embodiment of the invention. Screen 700 includes a Products form applet 710 that displays information for a selected product. Screen 700 further includes an Entitlements list applet 720 having a list table that displays all entitlement templates enabled for association with the selected product. An administrator/end-user can select an entitlement template in the list table, "drill-down" into the template to view and/or change details of the template (similar to that described above for the Service Admin screen), and define the products to be covered by the selected entitlement template. The administrator/end-user can also create a new entitlement template on the fly by going to a "Template Admin" screen.

As shown in FIG. 7, the list table in Entitlements list applet 720 includes columns for an "Entitlement Template Product" field and an "Agreement Line Item Products" field. The Entitlement Template Product field is a flag that can be set to enable coverage for all products and assets on an agreement line item that includes the entitlement template, if and when this template is instantiated into the agreement (e.g., by hitting the "Entitle" button, as described below). This field may be set, for example, if a particular product is designated to receive entitlements in certain templates, and the product is thereafter included in an agreement line item. By checking this flag, the products/assets in the agreement line item would receive the entitlements in the associated templates when the agreement is entitled.

The Agreement Line Item Products field is a flag that can be set to enable coverage for all products and assets defined in an entitlement template, if and when the template is instantiated into the agreement. This field may be set, for example, if a particular (service) product (e.g., for an extended warranty) is defined to include certain entitlement templates, and the (hard) products/assets to be covered by (and entitled to received) the entitlement templates are defined in the templates themselves. By checking this flag, the products/assets defined in the templates would receive the entitlements in the templates when the agreement is entitled.

The Entitlement Template Product and Agreement Line Item Products fields may be independently set to cover products/assets identified on the agreement line item and/or products/assets defined in the entitlement template (e.g., via the Products view in FIG. 6B).

Instantiating Entitlement Templates into Contracts

Figure 8:
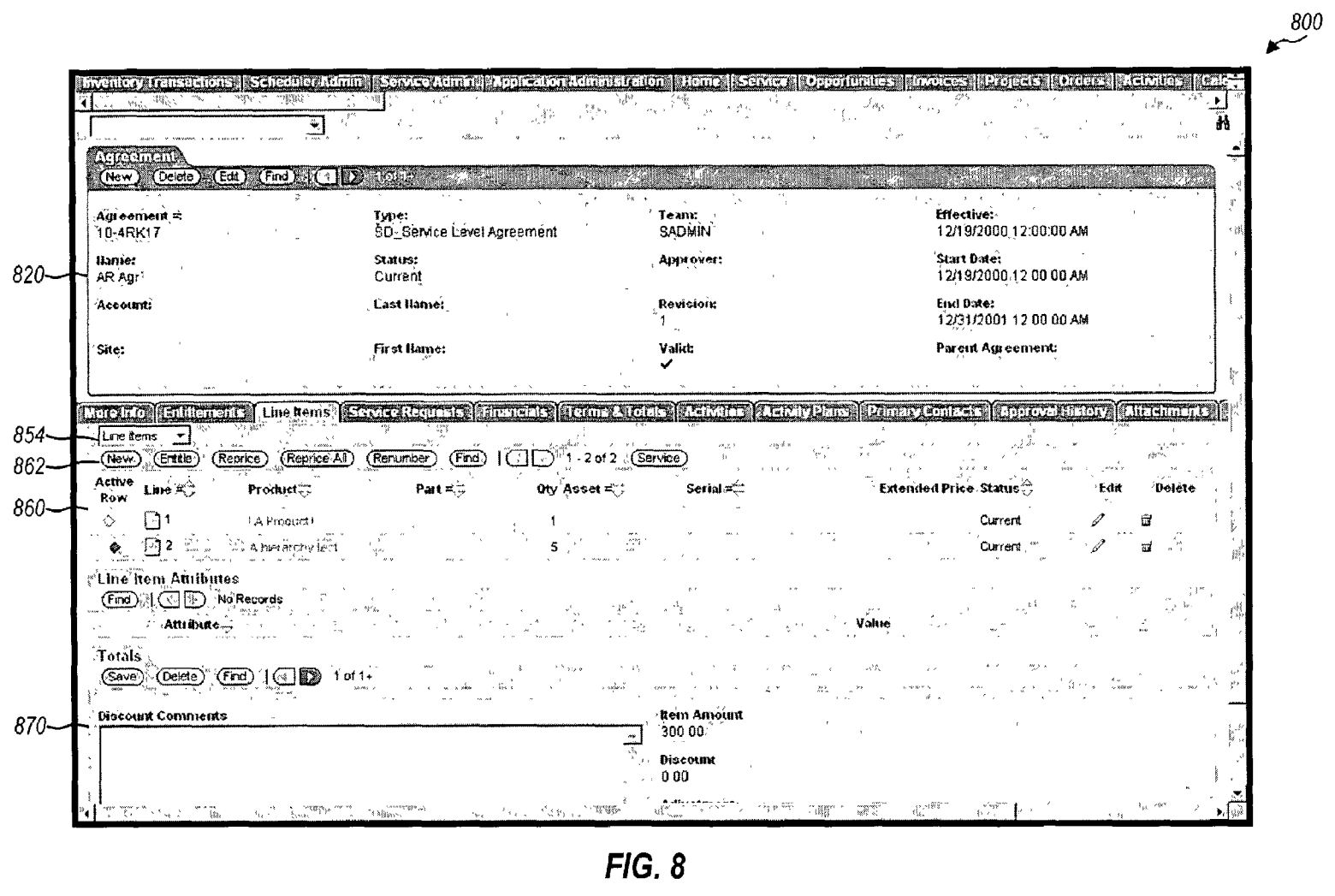

FIG. 8 shows an embodiment of a screen 800 that may be used to view and edit a selected agreement and to instantiate entitlement templates into the agreement. Screen 800 includes an Agreement form applet 820 that displays information for the selected agreement. Screen 800 also includes a Line Items list applet 860 used to display information for the line items in the selected agreement and to enable an administrator/end-user to interactively edit the agreement line items. Line Items list applet 860 may be invoked by selecting the "Line Items" choice in a list box 854. Other applets may be displayed by selecting other choices in list box 854.

Line Items list applet 860 includes a set of buttons 862 used to invoke various functions applicable for the agreement line items. An "Entitle" button (or some other icon or representation on the applet) may be invoked to instantiate entitlements for all line items and sub-line items listed in Line Items list applet 860. Upon hitting the Entitle button, the entitlements in the templates associated with the products/assets in the agreement line items are instantiated into the agreement and become part of the agreement. Thereafter, the entitlement templates are not needed. In an embodiment, if the Entitle button is hit a second time, any new entitlement templates associated with the product/asset are instantiated. The other entitlement templates are not modified unless the previous entitlement instances were deleted or new products/assets were added to the line item. A Copy function may be enabled as a deep copy so that entitlement template children records are copied along with template header. The Entitle button may be designed to be callable using Visual Basic, Java Script, or a workflow/business service.

Table 6 lists the information that may be automatically populated into the agreement from the entitlement templates, as a result of an instantiation. Other or different information may also be included in the agreement, and this is within the scope of the invention.

TABLE 6

| Field | Description |
| --- | --- |
| Entitlement Name | the name of the entitlement template |
| Related Line Item | the line item in the agreement to which the entitlement template is associated |
| Type | the entitlement type |
| Start Date | the date when the entitlements begin |
| End Date | the date when the entitlements end |
| Price List | a Price List, if any, to be used for the entitlement template |
| Rate List | a Rate List, if any, to be used for the entitlement template |
| Billable | a flag to indicate whether certain charges and expenses may be billed for the entitlement template |
| Priority | the user-assigned priority for the entitlement template |
| Activity Override | a flag to indicate if contract-based invoicing overrides the selected Price List and Rate List |
| Metrics records | the service metrics defined by the entitlement template |
| Products records | may include information for the following<br>1 - the primary product<br>2 - the asset, use asset, service product, and covered product<br>3 - the products and/or assets defined by the entitlement template as covered |
| PM records | the preventive maintenance plans defined by the entitlement template |
| Service Details records | the service details defined by the entitlement template |
| Price Details records | the special pricing terms enabled for the entitlement template |
| Accounts record | the account on the agreement header |
| Contacts record | the contact on the agreement header |

Figure 9:
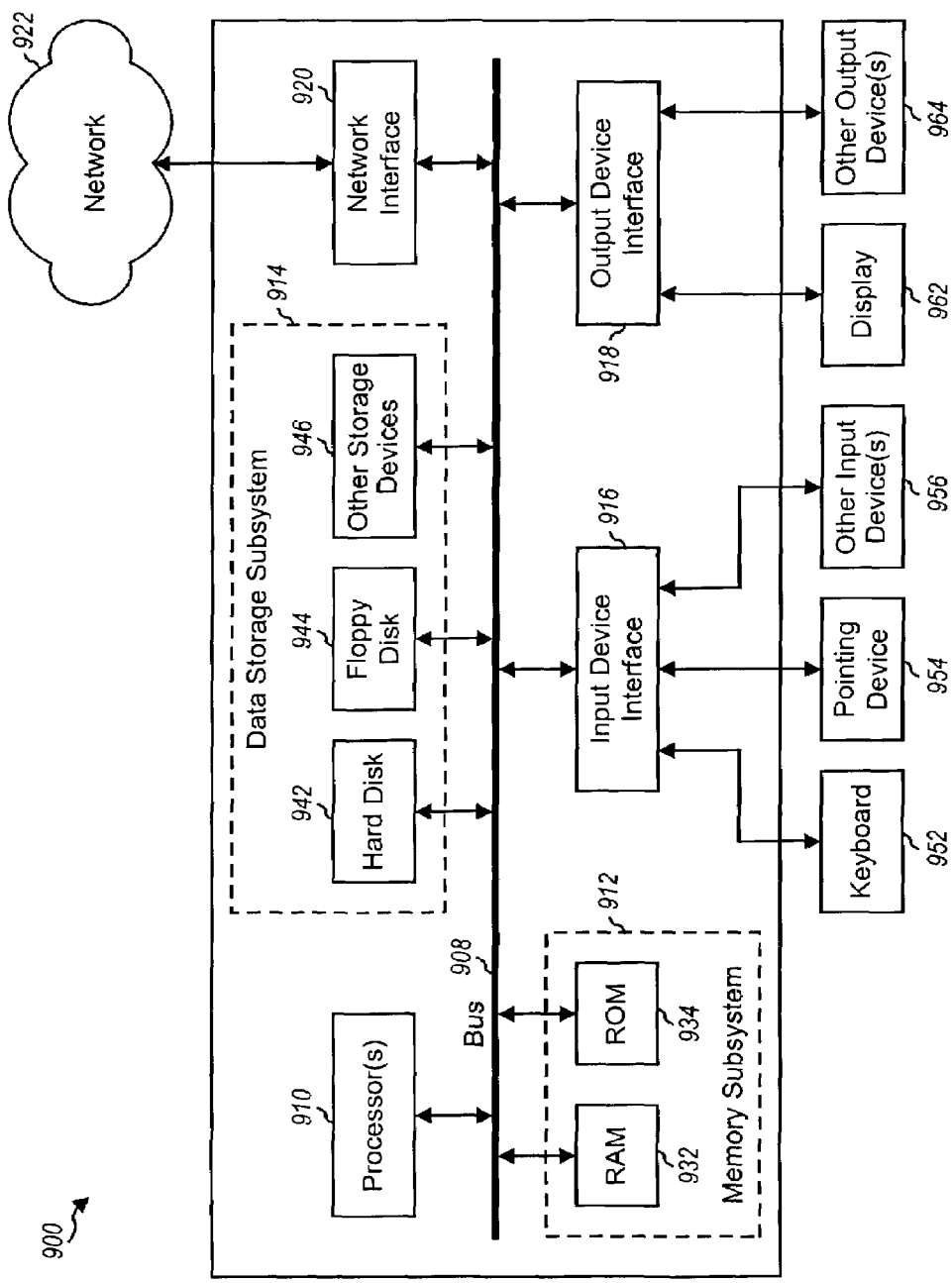
FIG. 9 is a block diagram of a computer system that may be used to implement the host server and client computers in FIG. 1.

FIG. 9 is a block diagram of an embodiment of a computer system 900 that may be used to implement the host server and client computers in FIG. 1. As shown in FIG. 9, system 900 includes a bus 908 that interconnects major subsystems such as one or more processors 910, a memory subsystem 912, a data storage subsystem 914, an input device interface 916, an output device interface 918, and a network interface 920.

Bus 908 provides a means for allowing various components and subsystems of system 900 to communicate with each other. Many of the subsystems and components of system 900 need not be at the same physical location but may be distributed at various locations throughout a communication network. Although bus 908 is shown in FIG. 9 as a single bus, alternate designs for bus 908 may include multiple busses.

Processor(s) 910 perform many of the processing functions for system 900 and communicate with a number of peripheral devices via bus 908. Memory subsystem 912 and data storage subsystem 914 store the program codes and data that implement various aspects of the invention and further provide the functionality of system 900. These program codes and data are then provided to memory subsystem 912 and the codes are executed by processor(s) 910. In a distributed environment; the program codes and data may be stored on a number of computer systems and used by the processors of these systems.

Memory subsystem 912 typically includes a number of memories including a random access memory (RAM) 932 and a read only memory (ROM) 934. RAM 932 is typically used to store codes and data during program execution and ROM 934 is typically used to store fixed codes and data.

Data storage subsystem 914 provides persistent (non-volatile) storage for program codes and data, and may include a hard disk drive 942, a floppy disk drive 944, and other storage devices 946 such as a compact digital read only memory (CD-ROM) drive, an optical drive, and removable media cartridge disk drive. Each of the storage devices may be associated with removable media (e.g., floppy disks, CD-ROMs, cartridges). One or more of the storage devices may be located at remote locations and coupled to system 900 via communication network 922.

Input device interface 916 provides interface with various input devices such as a keyboard 952, a pointing device 954 (e.g., a mouse, a trackball, a touch pad, a graphics tablet, a scanner, or a touch screen), and other input device(s) 956. In general, the term "input device" is intended to include all possible types of devices and ways to input information into system 900.

Output device interface 918 provides an interface with various output devices such as a display 962 and other output device(s) 964. Display 962 may be a cathode ray tube (CRT), a flat-panel device such as a liquid crystal display (LCD), or some other visual devices. In general, the term "output device" is intended to include all possible types of devices and ways to output information from system 900 to a human or to another machine or computer systems.

Network interface 920 provides an interface with outside networks including communication network 922. Through network interface 920, system 900 is able to communicate with other computer systems coupled to network 922. Network interface 920 may provide a wireline or wireless interface to network 922.

Many other devices or subsystems (not shown) may also be coupled to system 900. In addition, it is not necessary for all of the devices shown in FIG. 9 to be present to practice the invention. Furthermore, the devices and subsystems may be interconnected in configurations different from that shown in FIG. 9. The operation of a computer system such as that shown in FIG. 9 is readily known in the art and not described in detail herein. The source codes to implement some embodiments of the invention may be operatively disposed in memory subsystem 912 or stored on storage media such as a hard disk, a floppy disk, a CD-ROM that is operative with a CD-ROM player, or some other media.

The contract management system described herein may be implemented using a "thick-client" model whereby software modules for the contract management system are installed on both the host server and client computers. The contract management system described herein may also be implemented using a "thin-client" model whereby software modules for the contract management system are installed only on the host server, and the client computers can access data and functionality from the host server via browsers executed on the client computers. The browser-based thin-client model can provide various advantages over the thick-client model including (1) ease of installation, since the software modules for the thin-client model are typically only installed on the host server and not on the client computers, (2) ease of maintenance, since upgrades and other maintenance tasks are performed only on the host server, (3) high level of connectivity, since any user with a browser and (web) access may be able to interact with the host server, and other benefits.

FIG. 1 shows a specific operating mode whereby the contract manager is located at the host server. Other operating modes may also be supported and are within the scope of the invention. For example, some or all of the contract manager and the associated data may be provided to a client computer, which may then perform various functions described herein (e.g., automatically instantiate entitlements into contracts). Thus, the techniques described herein may be implemented in a "connected" mode (e.g., as shown in FIG. 1) or a "disconnected" mode whereby a client computer may be able to perform various functions, and the data (e.g., entitlement templates and contracts) may thereafter be synchronized during a subsequent connection with the host server.

Headings are included herein for reference and to aid in the locating certain sections. These heading are not intended to limit the scope of the concepts described therein under, and these concepts may have applicability in other sections throughout the entire specification.

The foregoing description of the specific embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein, and as defined by the following claims.

What is claimed is:

1. A computer program product comprising:
   a computer-readable medium having embodied therein computer-readable program codes, wherein the computer-readable program codes are configured to automatically instantiate entitlements into a contract by virtue of being configured to
      cause an applet to present a user interface to allow for the definition of a plurality of entitlement templates, each comprising a particular set of entitlements, wherein each entitlement template is definable to include a set of metrics;
      associate one or more entitlement templates with one or more products;
      form a contract having comprising at least one line item for at least one product; and
      instantiate entitlements from at least one entitlement template associated with the at least one product into the contract.

2. The computer program product of claim 1, wherein the computer-readable program codes are configured to instantiate, in part, by virtue of being configured to provide a button on a user interface screen.

3. The computer program product of claim 1, wherein the contract comprises a line item having a product comprised of a set of one or more entitlement templates.

4. The computer program product of claim 1, wherein the instantiated entitlements from the at least one entitlement template cover a set of one or more products defined in the at least one entitlement template.

5. The computer program product of claim 1, wherein the instantiated entitlements from the at least one entitlement template cover the at least one product in the contract.

6. The computer program product of claim 1, wherein
   the instantiated entitlements from the at least one entitlement template cover a set of one or more assets included in the at least one line item of the contract, and
   each asset is a specific instance of a particular product.

7. The computer program product of claim 1, wherein the set of metrics is indicative of a particular level of service.

8. The computer program product of claim 7, wherein the set of metrics is indicative of a maximum response time for a service activity.

9. The computer program product of claim 7, wherein the set of metrics is indicative of coverage hours for service activities.

10. The computer program product of claim 1, wherein each entitlement template is definable to include one or more preventive maintenance plans.

11. The computer program product of claim 1, wherein each entitlement template is definable to include one or more services.

12. The computer program product of claim 11, wherein each entitlement template is definable to include parameters for determining charges for time spent in connection with a service activity.

13. The computer program product of claim 11, wherein each entitlement template is definable to include parameters for determining charges for expenses incurred connection with a service activity.

14. The computer program product of claim 11, wherein each entitlement template is definable to include parameters for determining charges for parts required for a service activity.

15. The computer program product of claim 1, wherein each entitlement template is definable to include special pricing for a set of defined products.

16. The computer program product of claim 1, wherein limited access is granted for defining the plurality of entitlement templates.

17. A computer-implemented method comprising:
    automatically instantiating entitlements into a contract, comprising
       allowing the definition of a plurality of entitlement templates using a user interface presented using an applet, wherein
          each one of the entitlement templates comprises a particular set of entitlements,
          the entitlements for each template are definable to include one or more services, and
          the entitlements for each template are definable to include a set of metrics indicative of a particular level of service;
       associating one or more entitlement templates with one or more products;
       forming the contract having included therein at least one line item for at least one product; and
       instantiating entitlements from at least one entitlement template associated with the at least one product into the contract.

18. A computer system comprising:
    a user interface configured to facilitate automatic instantiation of an entitlement into a contract by virtue of comprising
       a first applet configured to display a plurality of entitlement templates, wherein
          each entitlement template is configured to be selected, and
          each entitlement template is configured to be edited upon the each entitlement template being selected; and
       a second applet configured to display one of a plurality of views for defining a selected entitlement template, wherein
          each one of the plurality of views is associated with a respective set of fields, and
          each one of the respective set of fields is configured to be used to define a particular component of an entitlement, and
          the entitlements for each entitlement template are, using the respective set of fields presented by said second applet, definable to include a set of metrics.

19. The user interface screen of claim 18, wherein the plurality of views comprises a first view for defining the set of metrics, and the set of metrics is indicative of a particular level of service to be provided under the selected entitlement template.

20. The user interface screen of claim 18, wherein the plurality of views comprises a second view for defining one or more preventive maintenance plans to be covered by the selected entitlement template.

21. The user interface screen of claim 18, wherein the plurality of views comprises a third view for defining details of services to be covered by the selected entitlement template.

22. The user interface screen of claim 18, wherein the plurality of views comprises a fourth view for defining special pricing for a set of defined products.

23. A computer system comprising:
a user interface configured to facilitate automatic instantiation of an entitlement into a contract by virtue of comprising
a first applet configured to display information for the contract; and
a second applet, wherein
the second applet configured to display a plurality of views for defining an entitlement template for the entitlement by virtue of the second applet being configured to display
an icon configured to instantiate entitlements from one or more entitlement templates associated with the one or more products into the contract, and
one or more line items for one or more products for the contract,
each one of the plurality of views is associated with a respective set of fields,
each one of the respective set of fields is configured to be used to define a particular component of the entitlement, and
the entitlement is definable to include a set of metrics using the respective set of fields.

24. A contract management system comprising:
a contract manager configured to
form a plurality of entitlement templates using a first applet, each one of said entitlement templates comprising a set of entitlements, wherein each entitlement template is definable to include a set of metrics,
associate one or more entitlement templates with one or more products,
form a contract having included therein at least one line item for at least one product using a second applet, and
automatically instantiate entitlements from at least one entitlement template associated with the at least one product into the contract; and
a local storage, wherein
the local storage is operatively coupled to the contract manager, and
the local storage is configured to store a plurality of contracts and the plurality of entitlement templates.

25. The contract management system of claim 24, wherein each entitlement template is definable to include one or more services and the set of metrics is indicative of a particular level of service.

26. A computer program product comprising:
code configured to automatically generate an invoice associated with a contract by virtue of comprising
code for a first applet, comprising
code configured to form a plurality of entitlement templates, each comprising one of the plurality of entitlement templates comprising a set of entitlements, wherein each entitlement template is definable to include a set of metrics;
code configured to associate one or more entitlement templates with one or more products;
code for a second applet, comprising
code configured to form a contract comprising at least one line item for at least one product;
code configured to instantiate entitlements from at least one entitlement template associated with the at least one product into the contract; and
a data storage medium configured to store the codes.

27. The computer program product of claim 26, wherein the entitlements for each template are configured to be defined to include one or more services and the set of metrics is indicative of a particular level of service.

* * * * *